United States Patent [19]

Pasichinskyj

[11] Patent Number: 4,904,926
[45] Date of Patent: Feb. 27, 1990

[54] MAGNETIC MOTION ELECTRICAL GENERATOR

[76] Inventor: Mario Pasichinskyj, 10666 NE. 11th Ct., Miami Shores, Fla. 33138

[21] Appl. No.: 244,021
[22] Filed: Sep. 14, 1988
[51] Int. Cl.⁴ .............................................. G05F 7/00
[52] U.S. Cl. .................................... 323/362; 323/330; 336/110; 324/117 R; 505/879
[58] Field of Search ....................... 323/362, 330, 331; 307/101, 104, 106; 336/110, 160, 170, 155; 324/117 R, 253; 505/879

[56] References Cited

U.S. PATENT DOCUMENTS

| | | | |
|---|---|---|---|
| 2,802,170 | 8/1957 | Starr et al. | 336/110 X |
| 2,915,637 | 12/1959 | McAdam | 336/110 X |
| 2,976,478 | 3/1961 | Aske | 323/330 |
| 3,226,639 | 12/1965 | McAdam | 324/117 R |
| 4,006,041 | 2/1977 | de Rivas | 323/362 |
| 4,077,001 | 12/1978 | Richardson | 307/104 X |
| 4,634,978 | 1/1987 | Watanabe | 324/253 |

*Primary Examiner*—Patrick R. Salce
*Assistant Examiner*—Kristine Peckman
*Attorney, Agent, or Firm*—M. K. Silverman

[57] ABSTRACT

A magnetic motion electrical generator includes an electrical winding defining a magnetically conductive zone having bases at each end, the winding including elements for the removing of an induced current therefrom. The generator further includes two pole magnets, each having a first and a second pole, each first pole in magnetic communication with one base of the magnetically conductive zone. The generator further includes a third pole magnet, the third pole magnet oriented intermediately of the first poles of the two pole electromagnets and in magnetic communication with the electromagnets, the third pole magnet having a magnetic axis substantially transverse to an axis of the magnetically conductive zone, the third magnet having a pole nearest to the conductive zone and in magnetic attractive relationship to the first poles of the two pole electromagnets, in which the first poles thereof are like poles. Yet further included in the generator are elements for cyclically reversing the magnetic polarities of the electromagnets. Said reversing means, through a cyclical change in the magnetic polarities of the electromagnets, will cause the magnetic flux lines associated with the magnetic attractive relationship between the first poles of the electromagnets and the nearest pole of the third magnet to correspondingly reverse, causing a wiping effect across the magnetically conductive zone, as lines of magnetic flux swing between respective first poles of the two electromagnets, thereby inducing electron movement within the windings and thusly generating a flow of current within the winding.

11 Claims, 5 Drawing Sheets

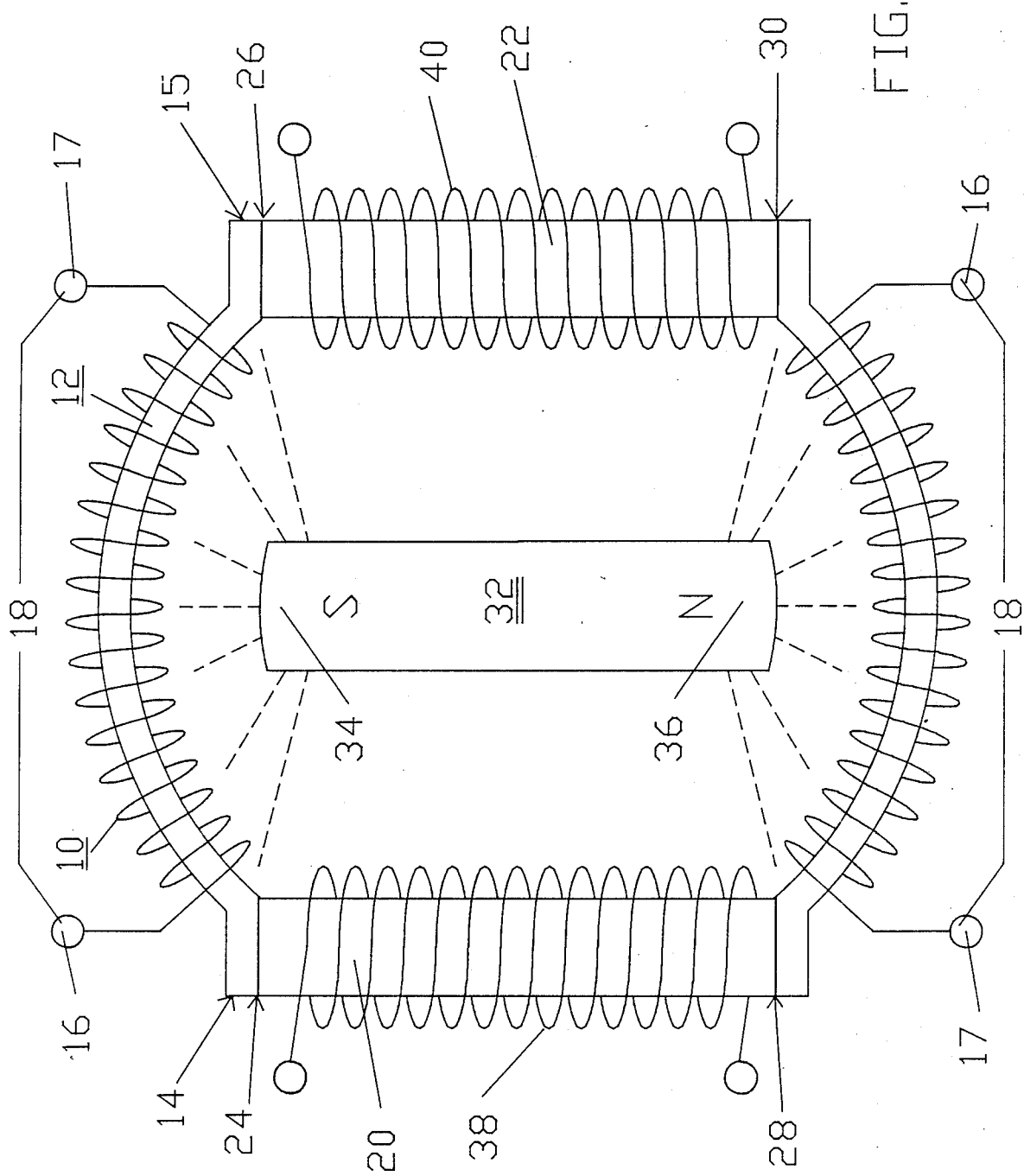

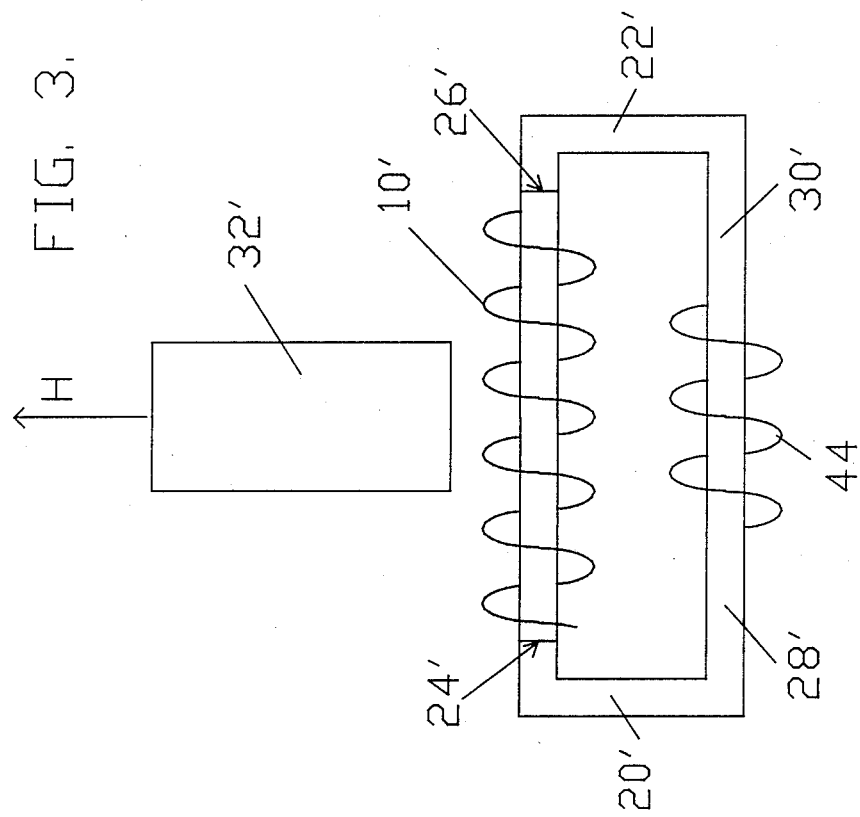
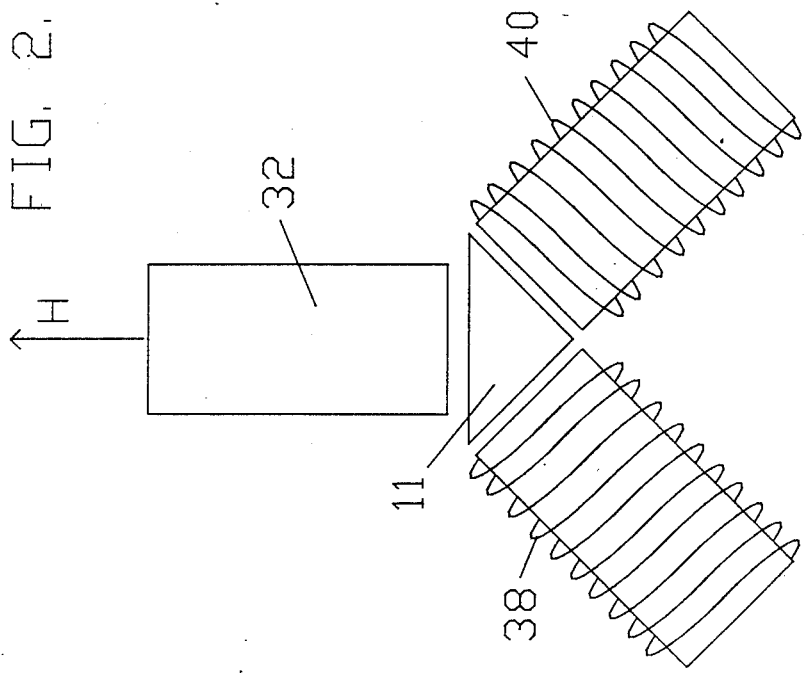

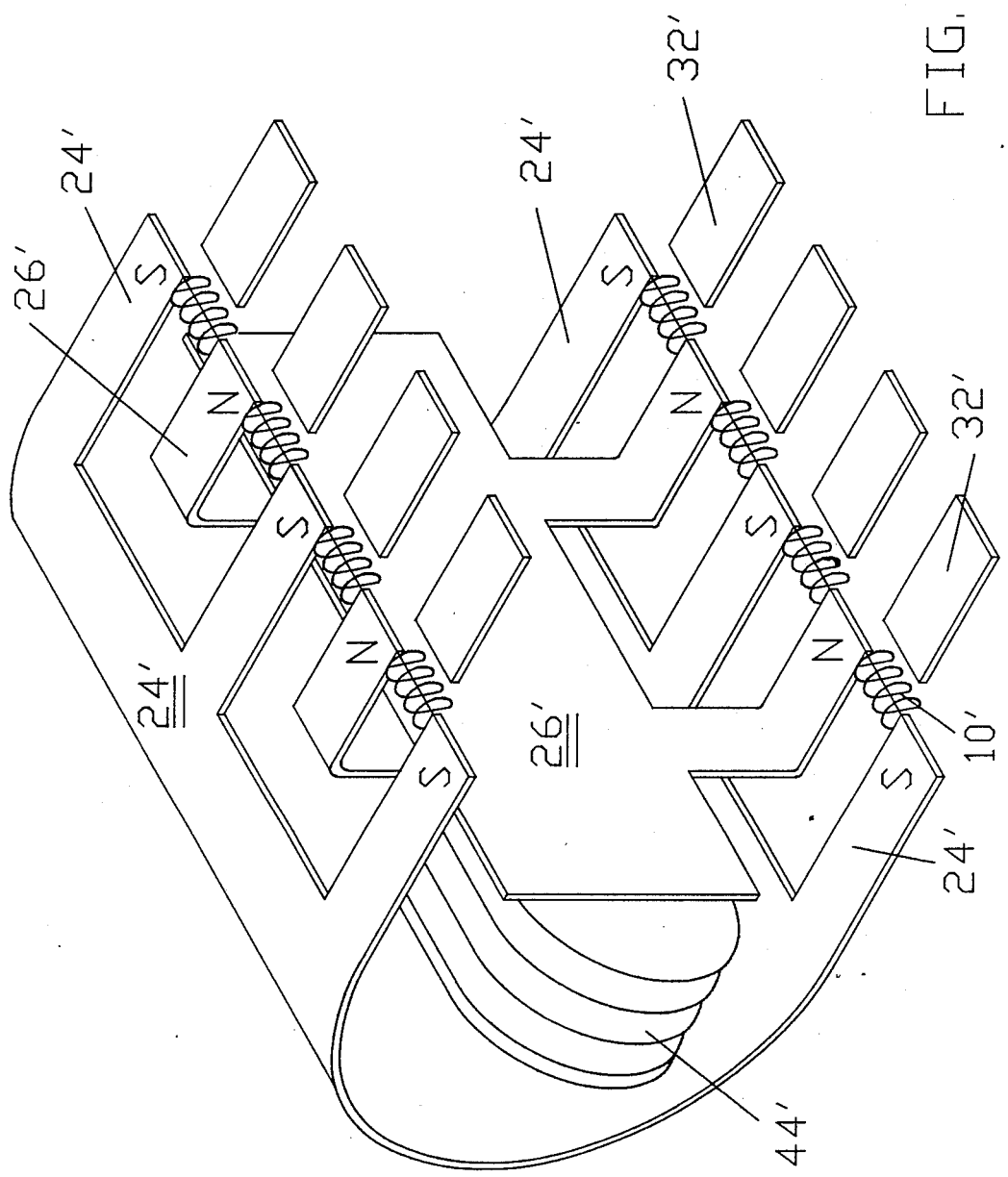

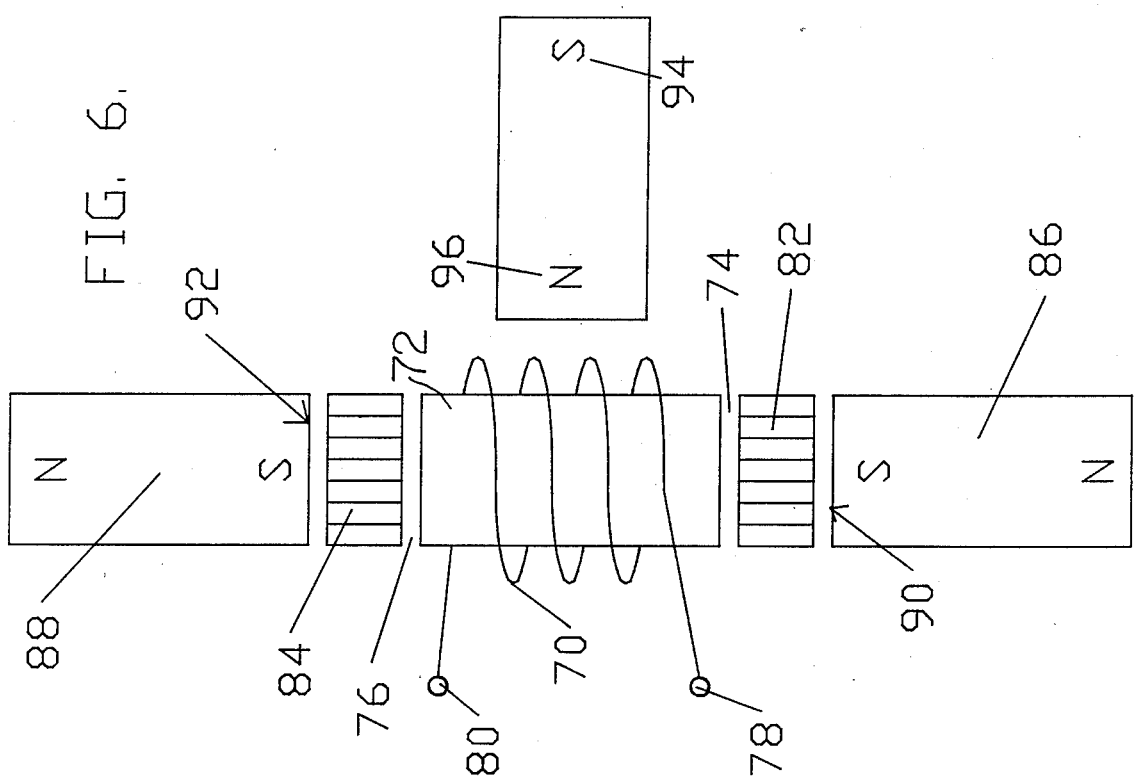
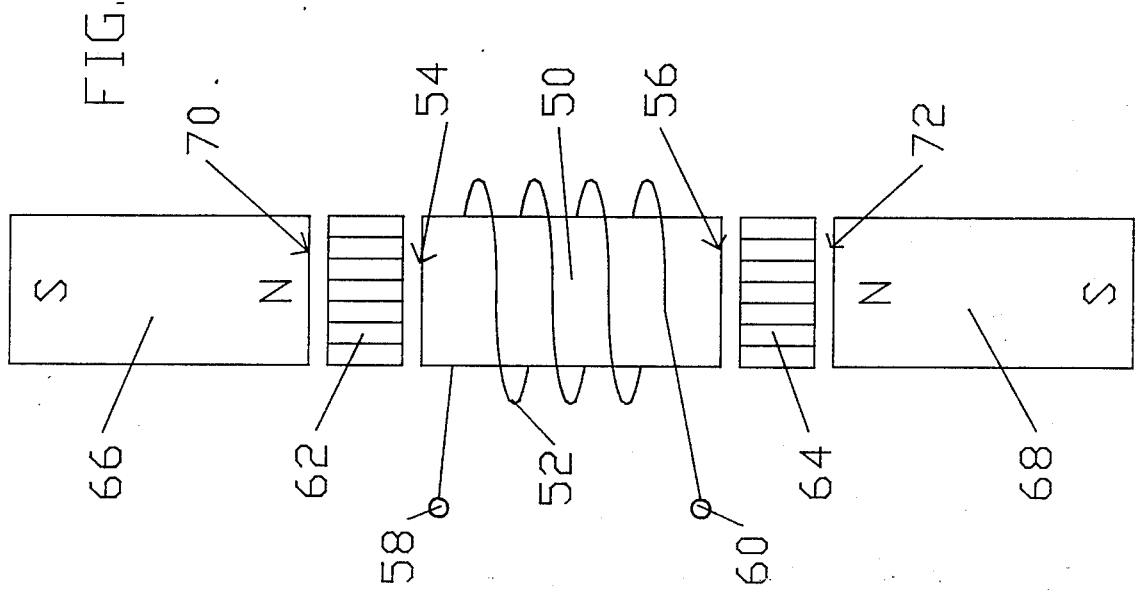

MAGNETIC MOTION ELECTRICAL GENERATOR

BACKGROUND OF THE INVENTION

The present invention relates to a solid-state electrical generator having no moving parts in its structure. More particularly, the instant invention makes use of a proposed extension of Faraday's Law, this extension constitutes a proposition to the effect that a changing magnetic field, relative to an electrical conductor, will induce an electric field therein, regardless of whether or not the source of the magnetic field undergoes physical movement. It is, through the present invention, suggested that to generate electric current, it is only necessary that a magnetic field move relative to a conductor and that, consequently, it is not necessary that the source magnet itself move to induce electric field or current into a conductor.

The most relevant prior art known to the inventor comprises U.S. Pat. No. 4,006,401 (1977) to De Rivas, entitled Electromagnetic Generator; and U.S. Pat. No. 4,077,001 (1978) to Richardson, entitled Electromagnetic Converter with Stationery Variable Reluctance Members.

The above reference to De Rivas discloses an electromagnetic generator which utilizes a permanent magnet and inductive means to "alternate by switching" the flux of the permanent magnet, thereby generating alternating current at the output thereof. Said reference, as well as Richardson, represent the only known direct attempts in the prior art to generate electricity by non-moving means through the manipulation of the magnetic field of a permanent magnet. In De Rivas, inductive means are used for the purpose of "magnetic switching". As such, inductive and related heat losses would produce a questionable level of performance.

The above reference to Richardson discloses an "energy conversion system" in which the flux of the permanent magnet is, as in De Rivas, "shifted" by inductive means. However, unlike De Rivas, Richardson makes use of a lamellar core which acts as a bi-stable magnetic valve placed in the proximity of the output windings to carry-off the induced power from the system.

Richardson accurately identifies many key concepts of power generation by non-moving systems and recognizes the need to optimize geometry, materials, control, timing and other factors which must be taken into consideration in the efficient generation of power through the shifting, oscillation and/or rotation of the magnetic field of a fixed permanent magnet. It is upon the teachings of Richardson and De Rivas that the invention set forth herein is most directly based.

SUMMARY OF THE INVENTION

The invention constitutes an electrical generator comprising an electrical winding defining a magnetically-conductive zone having bases at each end thereof, said winding including means for the removing of an induced current therefrom. The generator further includes two pole magnets, each having a first and second pole, each first pole thereof in magnetic communication with one base of said magnetically conductive zone. The generator further includes a third pole magnet, said third magnet oriented intermediately of said first poles of said two pole electromagnets and in magnetic communication with said electromagnets, said third pole magnet having a magnetic axis substantially transverse to an axis of said magnetically-conductive zone, said third magnet having a pole thereof nearest to said zone and in magnetic attractive relationship to said first poles of said two pole electromagnets, in which said first poles thereof are like poles. Yet further included in the generator are means for cyclically reversing the magnetic polarities of said electromagnets. Accordingly, said reversing means, through said cyclical change in said magnetic polarities of said electromagnets, will cause the magnetic flux lines associated with said magnetic attractive relationship between said first poles of said electromagnets and said nearest pole of said third magnet to correspondingly reverse, thereby causing a wiping effect across said magnetically conductive zone, as lines of magnetic flux swing between respective first poles of said two electromagnets, thereby inducing electron movement within said windings and thusly generating a flow of current within said winding.

It is accordingly an object of the present invention to provide an electric generator having no moving parts therein.

It is another object of the present invention to provide an electrical generator making use of both electromagnets and pole magnets in which electric current is induced through the oscillation or rotation of magnetic flux, while said magnets and electromagnets are kept stationery.

It is a further object to employ a permanent magnet in combination with an electromagnet to intensify current flow obtainable from said electromagnet.

It is a yet further object to provide an electromagnetic generator including a permanent magnet as a flux source in which the magnitude of the generated current of the generator increases as a function of the frequency of the signals applied to control the motion of the flux between the permanent magnet and the electromagnet.

The above and yet other objects and advantages of the present invention will become apparent from the hereinafter set forth Detailed Description of the Invention, the Drawings and Claims appended herewith.

BRIEF DESCRIPTION OF THE DRAWINGS

FIG. 1 is a schematic of a first embodiment of the present invention, employing one permanent magnet and two electromagnets.

FIG. 2 is a schematic illustration of a variation of the embodiment of FIG. 1.

FIG. 3 is a schematic view of a further variation of the embodiment of FIG. 1.

FIG. 4 is a schematic view of an embodiment of the structure shown in FIG. 3.

FIG. 5 is a schematic view of a second embodiment of the present invention.

FIG. 6 is a schematic view of a third embodiment of the present invention.

DETAILED DESCRIPTION OF THE INVENTION

Figure 7:
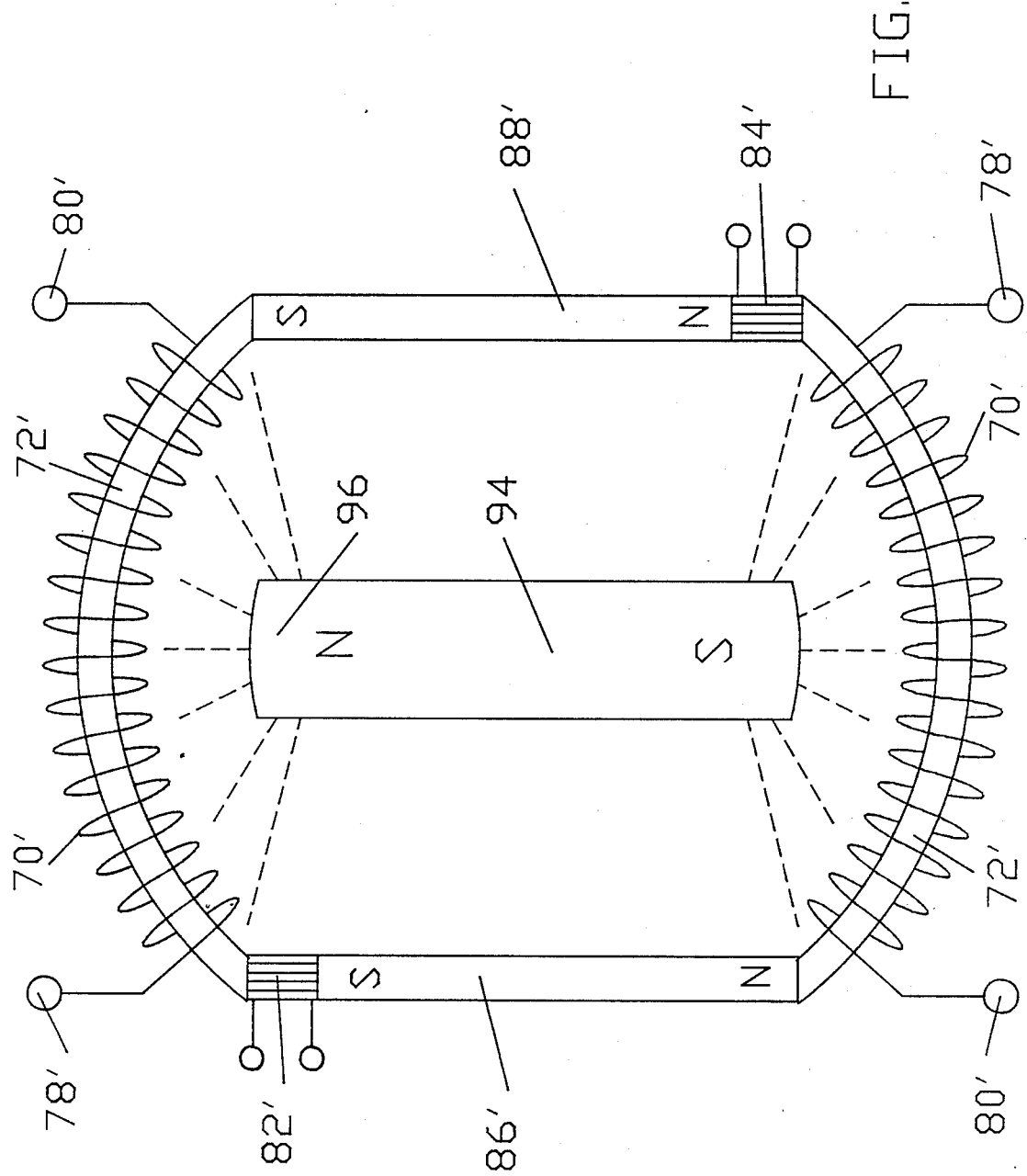
FIG. 7 is a schematic view of a variation of the embodiment of FIG. 6.

With reference to the view of FIG. 1, there is shown an electrical winding 10 defining a magnetically conductive zone 12, said zone having bases 14 and 15 at each end thereof. Said winding 10 includes means 16 and 17 for removing an induced current from said winding means 10 and carrying said current to an output 18.

Further included in the embodiment of FIG. 1 is a first pole electromagnet 20 and a second pole electromagnet 22, each of said electromagnets having first ends 24 and 26 respectively and second ends 28 and 30 respectively. Each of said first poles 24 and 26 are in magnetic communication with respective first and second bases 14 and 15 of said magnetically conductive zones.

Further included in the present electrical generator is a third pole magnet 32, said third pole magnet comprising a permanent magnet. Said third magnet is oriented with a first end 34 intermediately of said first poles 24 and 26 of said two pole electromagnets 20 and 22, and is in magnetic communication with said electromagnets. A magnetic axis defined by the poles of said permanent magnet 32 is substantially transverse to an axis which is defined by the geometry of said magnetically conductive zone 12. The pole 34 of said third magnet 32 is in magnetic attractive relationship to said first pole 24 and 26 of said two pole electromagnets 20 and 22, in which said first poles 24 and 26 are like poles and said pole 34 of said permanent magnet 32 is an opposite pole to said poles 24 and 26.

Yet further provided are means 38 and 40 (shown in the form of windings) for cyclically reversing the magnetic polarities of said electromagnets 20 and 22. Said control means, through cyclical changing of the magnetic polarities of said electromagnets, will cause the magnetic flux lines associated with said attractive magnetic relationship between said first pole 24 and 26 of said electromagnets and said pole 34 of said third and permanent magnet 32 to correspondingly reverse. This will cause a wiping effect across said magnetically conductive zone 12, as lines of magnetic flux swing between respective first poles 24 and 26 of said electromagnets in a high-frequency reciprocating fashion. This movement of lines of flux will induce electron movement within said winding 10, thusly generating a flow of current within said winding. Accordingly, the power output from the system of FIG. 1 will be a function of the strength of said magnets 20, 22 and 32, the number of current loops within winding 10, and the rate of reversal of the magnetic polarities of said electromagnets 20 and 22 by said cyclical reversing means.

As may be appreciated, said electrical winding 10 may comprise a helical winding, and said magnetically conductive zone may comprise a magnet core or a magnetically conductive coating.

Either such core or said winding may commprise a super-conductive material.

Further, said control means 38 and 40 may comprise flat spirally-wound elements in which the plane of such flat spiral elements is transverse to the primary axis of said electromagnets 20 and 22.

Alternatively, said cyclical reversing means may comprise means for applying an alternating pulsating DC current at said bases 14 and 15 of said magnetically conductive surface.

There may be further provided means for magnetically concentrating lines of magnetic flux in said magnetically conductive zone. For example, such means may comprise a pole shoe of a magnet of like polarity to said pole 34 of said permanent 32, in which such pole shoe would symmetrically surround said winding 10.

With reference to FIG. 2, it is seen that there is shown the schematic thereof a variation of the embodiment of FIG. 1, the primary difference therebetween being the use of solid state means such as a liquid or semiconductor 11 in lieu of winding 10 and magnetically conductive surface 12. Therein, the lines of magnetic flux will oscillate between first poles of the electromagnets, through the liquid or semiconductive materials, thereby inducing electron movement within the liquid or semiconductor and, thusly, generating a flow of current therewithin.

With reference to the view of FIG. 3, there is seen a yet further variation of the embodiment of FIG. 1 in which said control means for cyclically reversing the magnetic polarity of said electromagnets comprise an electromagnetic path between said ends 28' and 30' of said electromagnets 20' and 22'. Thereby, it may be seen that the embodiment of FIG. 3 differs from the embodiment of FIG. 1 only in the provision of a single control means 44 in lieu of the separate control means 38 and 40 of the embodiment of FIGS. 1 and 2.

With reference to FIG. 4, there is shown, in schematic view, a further embodiment of the invention of FIG. 3 in which the basic structure thereof is simply repeated a multiplicity of times. Therein, permanent magnetic elements 32' appear to the right of the figure, and electromagnetic pole elements 24' and 26' appear and repeat in sequence, windings 10' and control means 44' are also shown therein.

With reference to the embodiment of FIG. 5, there is shown an electrical winding 50 disposed about a substantially cylindrical magnetically conductive axial surface 52 having bases 54 and 56 at each end thereof. The winding 50 includes means 58 and 60 for removing an output current therefrom.

Yet further provided in the embodiment of FIG. 5 are two variable reluctance means (VRMs) 62 and 64, one disposed in magnetic communication with each of said bases 54 and 56 of said magnetically conductive surface 52.

Yet further provided in the embodiment of FIG. 5 are means for controlling said VRM's 62 and 64 to cyclically and axially increase and decrease the reluctance thereof, such that the reluctance of one VRM is decreased while the reluctance of an opposite VRM is inversely increased, and vice versa.

Yet further provided in the embodiment of FIG. 5 are two permanent pole magnets 66 and 68, each having like poles 70 and 72 thereof in magnetic communication with a surface of said VRMs 62 and 64 other than that surface which is in magnetic communication with one of said bases 54 and 56 of said magnetically conductive surface 52. Thereby, the polarity of the magnetic axis of said magnetic surface of said winding will reverse in response to cyclical changes in the magntic reluctance of said VRMs 62 and 64, causing an expansion and compression of the magnetic axis of said surface 52, thereby causing magnetic flux to swing between respective like poles 70 and 72 of said two permanent magnets 66 and 68, this causing electron movement within said windings 50, and generating a flow of current therewithin.

Said VRMs 62 and 64 may be thought of as magnetic couplers and decouplers in that they selectively bring permanent magnet 60 and 68 into and out of the magnetic circuit of the embodiment of FIG. 5.

It is to be appreciated that said VRMs 62 and 64 may take many forms, these including electrical coil means surrounding a magnetic core in which excitation of said coil will effect a change in the magnetic reluctance of said core; wafers of superconductive material which, in a preferred embodiment, will be flat spirally-wound elements, the plane of such flat spiral elements being transverse to the axis of the magnetic path of travel therewithin; and means for cyclically applying a pulsating DC current at said bases 54 and 56 of said magnetically-conductive surface 52. Also, as in other embodiments, means for magnetically concentrating lines of magnetic flux about the region of said winding may be employed.

With reference to the embodiment of FIG. 6, the electrical generator thereof is seen to include an electrical winding 70 disposed about a substantially cylindrical magnetically conductive surface 72 having bases 74 and 76 at each end thereof, in which said winding means 70 includes means 78 and 80 for removing an induced current therefrom.

The embodiment of FIG. 6 further includes two variable reluctance means (VRMs) 82 and 84, one disposed in magnetic communication with each of said bases 74 and 76 of said magnetically conductive surface.

Yet further provided in the embodiment of FIG. 6 are means for controlling said VRMs 82 and 84 to cyclically increase and decrease the reluctance thereof such that the reluctance of one VRM is decreased while the reluctance of an opposite VRM is inversely increased, and vice versa.

Yet further provided in the embodiment of FIG. 6 are two permanent pole magnets 86 and 88, each having like poles thereof 90 and 92 in magnetic communication with one of said bases 74 and 76 respectively of said magnetically conductive surface 72. As may be noted, said VRM's 82 and 84 are interposed between said poles 90 and 92 of said first and second permanent magnets 86 88 respectively.

Yet further provided in the embodiment of FIG. 6 is a third pole magnet 94 which is oriented intermediately of said VRMs 82 and 84 and which is in magnetic communication therewith. Said third pole magnet 94 exhibits a magnetic axis which is substantially transverse to an axis connecting said VRMs. Further, said third magnet 94 possesses a pole 96 thereof which is disposed near to said windings 70 and which is in attractive magnetic relationship to said like poles 90 and 92 of said permanent magnets 86 and 88. Accordingly, said VRM control means, through cyclical changes in the magnetic reluctance of said VRM's at the bases 74 and 76 of said magnetically conductive surface, will cause the magnetic flux lines associated with the attractive magnetic relationship between said like poles of said permanent pole magnets and said nearest pole of said third magnet to correspondingly couple and decouple, this thereby causing a wiping effect across said winding as lines of magnetic flux swing between respective like poles 90 and 92 of said two permanent pole magnets 86 and 88 thereby causing electron movement within said winding and thusly generating a flow of current therewithin.

With reference to the embodiment of FIG. 7, this may be seen to comprise an elaboration of the embodiment of FIG. 6 in that the upper and lower hemisphere of FIG. 7 are seen to symetrically include the same elements above described with reference to FIG. 6. However, in the view of FIG. 7, the use of a magnetic concentrator 98 is also shown. Also, VRM's 82' and 84' are used.

It is to be appreciated that the magnetically conductive surface 72' of FIG. 7 may comprise many materials, these including such materials as an magneto hydro dynamic liquid, a super-conducting liquid, a magnetic coating and a paramagnetic coating.

Further it is to be appreciated that said VRMs may comprise many materials which, in addition to those above noted, may include a bi-metallic solid-state element, a curved junction solid-state element, or a field effect solid-state element.

While there has been shown and described the preferred embodiments of the present invention, it is to be understood that the invention may be embodied otherwise than is herein specifically illustrated and described and that, within such embodiments certain changes in the detail and construction, in the form and arrangements of the parts, may be made without departing from the underlying idea or principles of this invention within the scope of the appended claims.

Having thus described my invention, what I claim is new, useful and nonobvious and, accordingly, secured by Letters of Patent of the United States is:

1. An electrical generator, comprising:
    (a) an electrical winding defining a magnetically conductive zone having bases at each end thereof, said winding including means for removing an induced current therefrom;
    (b) two pole electromagnets, each having a first and a second pole, each first pole thereof in magnetic communication with one base of said magnetically conductive zone;
    (c) a third pole magnet, said magnet comprising a permanent magnet, said third magnet oriented intermediately of said first poles of said two pole electromagnets and in magnetic communication with said electromagnets, said third pole magnet having a magnetic axis substantially transverse to an axis of said magnetically conductive zone, said third magnet having a pole thereof nearest to said zone and in magnetic attractive relationship to said first poles of said two pole electromagnets, in which said first poles thereof are like poles;
    (d) control means for cyclically reversing the magnetic polarities of said electromagnets,
    whereby said control means, through said cyclical change in said magnetic polarities of said electromagnets, will cause magnetic flux lines associated with said attractive magnetic relationship between said first poles of said electromagnets and said nearest pole of said third magnet to correspondingly reverse, thereby causing a wiping effect across said magnetically conductive zone, as lines of magnetic flux swing between respective first poles of said two electromagnets, thereby inducing electron movement within said winding and thusly generating a flow of current within said winding.

2. The electrical generators recited in claim 1 which said path of said wiping effect occurs along the same axis as a principal axis of said magnetically conductive zone.

3. The generator as recited in claim 2 in which said electrical winding about said magnetically conductive zone comprises a helical winding.

4. The generator as recited in claim 3 in which said magnetically conductive zone comprises a magnetic core.

5. The generator as recited in claim 4 in which said core and windings comprise a superconductive material.

6. The generator as recited in claim 2 in which said control means comprises flat spirally-wound elements, the plane of such flat spiral elements being transverse to said primary axis of said electromagnets.

7. The generator as recited in claim 1 in which said control means comprises an electromagnetic path between said second ends of said electromagnets in which a polarity control signal is applied across said path.

8. The electrical generator as recited in claim 7 in which said electrical winding about said magnetically conductive zone comprises a helical winding.

9. The generator as recited in claim 8 in which said magnetically conductive zone comprises a magnetic core.

10. The generator as recited in claim 8 in which said core and windings comprise a superconductive material.

11. The generator as recited in claim 1 in which said control means comprises flat spirally wound elements, the plan of said flat spiral elements being transverse to the primary axis of said magnetic path of travel.

* * * * *